United States Patent

Varadaraj et al.

[11] Patent Number: 5,840,211
[45] Date of Patent: Nov. 24, 1998

[54] OIL SLICK DISPERSANTS

[75] Inventors: Ramesh Varadaraj, Flemington; Max Leo Robbins, South Orange; Jan Bock, Warren; Salvatore James Pace, Milford, all of N.J.

[73] Assignee: Exxon Research and Engineering Company, Florham Park, N.J.

[21] Appl. No.: 678,840

[22] Filed: Jul. 12, 1996

[51] Int. Cl.⁶ ....................................... B01J 13/00
[52] U.S. Cl. .......................... 252/312; 252/314; 252/356; 210/749; 210/925
[58] Field of Search .................................. 252/312, 356, 252/314; 210/749, 925

[56] References Cited

U.S. PATENT DOCUMENTS

| | | | |
|---|---|---|---|
| 4,888,119 | 12/1989 | Klewsaat | 510/527 |
| 5,300,227 | 4/1994 | Varadaraj et al. | 252/356 |
| 5,503,774 | 4/1996 | Brons et al. | 252/357 |

*Primary Examiner*—Richard D. Lovering
*Attorney, Agent, or Firm*—Jay Simon; Gerhard H. Hughes

[57] ABSTRACT

A composition for dispersing oil slicks comprises a surfactant or a mixture of surfactants having the general formula:

$$R_1R_2N^+HR_3{}^-OCR_4 \qquad \text{I}$$
$$\phantom{R_1R_2N^+HR_3{}^-O}\overset{O}{\underset{\|}{}}$$

wherein $R_1$ and $R_2$ may be the same or different oxyalkylene or polyoxyalkylene groups, and wherein $R_3$ and $R_4$ may be the same or different alkyl or alkenyl groups. The composition also includes a carrier solvent.

3 Claims, No Drawings

OIL SLICK DISPERSANTS

FIELD OF THE INVENTION

The present invention relates generally to the chemical dispersion of oil slicks and more particularly to the dispersion of heavy waxy crudes and resids.

BACKGROUND OF THE INVENTION

The accidental discharge of crude oil into marine or fresh water environments if not effectively treated, results in oiling of the shoreline. Therefore, a number of techniques have been devised to minimize shoreline oiling resulting from such accidents when they occur.

One method for dealing with oil slicks on water is to treat the oil slick with the chemical dispersant which breaks the oil film into small droplets and disperses these droplets into the water column. It is a technique that is effective with light and medium crude oils, under optimum conditions of dispersant spraying and wave energy. Unfortunately, however, laboratory dispersant effectiveness testing has shown that viscous and waxy crudes are relatively more difficult to disperse than crudes with low viscosity and wax content. With the projected increase in traffic in the heavier and waxier crude oils there is a need for approved dispersants that are effective over a wide range of crudes encompassing light, medium and heavier waxy crudes.

Accordingly, one object of the present invention is to provide surface active compositions which are capable of dispersing a wide range of crudes.

Another object of the present invention is to provide dispersing compositions that are particularly suitable for dispersing heavy and waxy crudes.

SUMMARY OF THE INVENTION

Broadly stated, a composition for dispersing oil slicks comprises a surfactant or a mixture of surfactants having the general formula:

wherein $R_1$ and $R_2$ may be the same or different oxyalkylene or polyoxyalkylene groups, and
wherein $R_3$ and $R_4$ may be the same or different alkyl or alkenyl groups. The composition also includes a carrier solvent.

In another embodiment of the present invention there is provided a method for dispersing oil slicks on water, especially oil slicks of heavy and waxy crudes comprising applying a solution of a surfactant or mixtures of surfactants having the above described structural formula I on the surface of the oil slick.

DETAILED DESCRIPTION OF THE INVENTION

The process of the present invention for dispersing oil slicks on water comprises:
treating the oil slick with a surfactant or a mixture of surfactants having the formula:

wherein $R_1$ and $R_2$ may be the same or different oxyalkylene or polyoxyalkylene group having from 2 to about 10 carbon atoms in the alkylene moiety and $R_3$ and $R_4$ may be the same or different alkyl or alkenyl groups.

In the practice of the present invention, it is particularly preferred that $R_1$ and $R_2$ be oxyethylene or polyoxylethylene groups, represented by the formula:

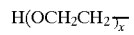

wherein x is from 1 to 25.

In the practice of the present invention it is also preferred that $R_3$ and $R_4$ be selected from different alkyl or alkenyl groups having from 8 to 20 carbon atoms.

The compounds of formula I above may be prepared by reacting a dioxyalkyl amine with an alkyl or alkenyl carboxylic acid. The reaction may be carried out neat or in the presence of a suitable solvent at temperatures ranging from about 20° C. to about 100° C. Suitable solvents include paraffinic, napthanic and aromatic hydrocarbons. Indeed, in order to be able to efficiently distribute the surface active agent on an oil slick, it is particularly preferred that the surface active agent be dissolved in a hydrocarbon solvent. Thus, if desired, the amine and acid can be combined directly in the solvent. It is particularly preferred, however, to use normal paraffinic solvents such as those sold under the trade name Norpar by Exxon U.S.A., Houston, Tex. as the carrier vehicle.

The amount of solvent employed, of course, is not critical. Sufficient solvent is used to dissolve the surface active agent. Amounts of solvent higher than necessary to dissolve the surfactant can be used, especially if the composition is going to be applied at temperatures below about 20° C. As a general guide, the amount of surfactant used will be in the range of about 5 to about 65 wt. % based on the total weight of the surfactant and solvent.

The amount of the surfactant applied to an oil slick will vary widely. Generally, an amount sufficient to at least disperse some of the oil will be applied. Also, while the compositions are especially useful in dispersing heavy and waxy crudes they are suitable for treatment of lighter crudes as well. As will be appreciated, heavy and waxy crudes have viscosities in the range of about 2000 to about 15,000 centipoise at 25° C. and an API gravity below about 25.

The compositions of the present invention may also contain other components, if so desired.

The tests given in the following examples further illustrate the present invention.

Example 1—Dispersant Formulation

A 40/60 surfactant blend of stearyl ethammonium-10 oleate and stearyl ethammonium-5 oleate was made in Norpar-13 solvent. The total weight percent of the surfactants in the formulation was 50%, the balance was Norpar-13. The dispersant formulation was homogeneous and stable at room temperature.

Examples 2–7 Dispersant Effectiveness Testing

The dispersant was premixed into the crude oil or resid at a dispersant to oil ratio of 1:10. Next, 150 ml of synthetic sea water or fresh water was placed in 300 ml 4-baffled bottom flask and 0.533 g of treated crude oil was added to the flask. The oil to water ratio was 1:300. The flask was placed on an orbital shaker and shaken at 125 or 150 rpm for 45 minutes. After mixing for 45 minutes, the contents of the flask were transferred to a 250 ml separator funnel to allow the undispersed droplets to coalesce. The contents were immediately withdrawn up to the coalesced oil. The withdrawn dispersed phase was analyzed for percent dispersion and mean droplet size by a Coulter Counter technique using a Coulter Multisizer II instrument. In Table 1, the types of oil tested, the percent dispersion and mean droplet size are given.

TABLE 1

| Example | Oil | Viscosity, cP 25° C., 10 sec$^{-1}$ | % Dispersed | Mean Droplet Diameter Microns |
|---|---|---|---|---|
| 2 | Bunker C | 4500 | 88 | 13.4 |
| 3 | Chad Kome | 8500 | 43 | 24.9 |
| 4 | Chad Bolobo | 6000 | 43 | 19.2 |
| 5 | Venezuelan B13 | 14,000 | 78 | 13.9 |
| 6 | Venezuelan B DOS | 2400 | 60 | 11.5 |
| 7 | Arab Med | 12.5 | 70 | 11.5 |

The results of the dispersion experiment on sea water are summarized in Table 1. It is clear that over a range of viscosities from 12.5 centipoise (Arab Medium) to 14000 centipoise (Bachaquero 13) the dispersant formulation is very effective in dispersing resids and crude oils. The efficiency of dispersion as measured by the mean droplet size is also high. Droplets of mean diameter 11.5 to 25 microns are produced by dispersion with this formulation.

Example 9

The results of the dispersion experiment using fresh water is summarized in Table 2 below. For comparison, the result on sea water (Example 8) is also included in the Table.

TABLE 2

| Examples | Oil | H$_2$O | % Dispersed | Mean Droplet Diameter, (Microns) |
|---|---|---|---|---|
| 8 | Bunker C | Sea | 88 | 13.4 |

TABLE 2-continued

| Examples | Oil | H$_2$O | % Dispersed | Mean Droplet Diameter, (Microns) |
|---|---|---|---|---|
| 9 | Bunker C | Fresh | 90 | 19.6 |

The dispersant formulation is observed to very effective and efficient in fresh water as it is in sea water.

What is claimed is:

1. A method for dispersing heavy waxy crude oil slicks on water comprising:

applying to the heavy waxy crude oil slick; wherein the viscosity of the heavy or waxy, crude oil ranges from about 2000 to about 15,000 centipoise at 25° C., a composition consisting of a hydrocarbon solvent and a surfactant or mixture of surfactants having the formula:

$$R_1R_2N^+HR_3^-\overset{O}{\overset{\|}{O}CR_4}$$

where $R_1$ and $R_2$ are the same or different oxyethylene or polyoxyethylene groups represented by the formula:

$$H(OCH_2CH_2)_x,$$

where x is an integer of from 1 to about 25; and $R_3$ and $R_4$ are the same or different alkyl or alkenyl groups having from about 8 to about 20 carbon atoms.

2. The method of claim 1 wherein the composition contains from about 5 to 65 wt. % surfactant based on the total weight of the composition.

3. The method of claim 2 wherein the solvent is selected from the group consisting of paraffinic, napthenic and aromatic hydrocarbons and mixtures thereof.

* * * * *